(12) United States Patent
Templeman et al.

(10) Patent No.: US 9,899,648 B2
(45) Date of Patent: Feb. 20, 2018

(54) BATTERY HOLDER AND ISOLATION ASSEMBLY

(71) Applicant: King Products, LLC, Lenexa, KS (US)

(72) Inventors: Jon Clayton Templeman, Overland Park, KS (US); Brock Christian Templeman, Overland Park, KS (US)

(73) Assignee: King Products, LLC, Lenexa, KS (US)

( * ) Notice: Subject to any disclaimer, the term of this patent is extended or adjusted under 35 U.S.C. 154(b) by 937 days.

(21) Appl. No.: 14/292,274

(22) Filed: May 30, 2014

(65) Prior Publication Data

US 2014/0356678 A1 Dec. 4, 2014

Related U.S. Application Data

(60) Provisional application No. 61/829,785, filed on May 31, 2013.

(51) Int. Cl.
*H01M 2/10* (2006.01)

(52) U.S. Cl.
CPC ...... *H01M 2/1083* (2013.01); *H01M 2220/20* (2013.01)

(58) Field of Classification Search
CPC ............. H01M 2/1016; H01M 2/1072; H01M 2/1077; H01M 2/1083
See application file for complete search history.

(56) References Cited

U.S. PATENT DOCUMENTS 4,508,794 A 2/1985 Wright

FOREIGN PATENT DOCUMENTS

| DE | 19828600 C1 | 1/2000 |
|---|---|---|
| JP | H07223499 A | 8/1995 |
| RU | 18212 U1 | 5/2001 |

OTHER PUBLICATIONS

International Search Report and Written Opinion; dated Oct. 16, 2014.

*Primary Examiner* — Erez Gurari
(74) *Attorney, Agent, or Firm* — Hovey Williams LLP

(57) ABSTRACT

A battery holder for securing a battery to a vehicle and for mechanically isolating the battery from the vehicle is provided. The battery holder includes a vehicle mounting plate, a lower battery containment plate, an upper battery containment plate, a number of spacer rods, and a number of shock absorbing elements. The lower battery containment plate and the upper battery containment plate secure the battery to the shock absorbing elements. The shock absorbing elements prevent vibrations and shocks from being transferred from the vehicle to the battery.

21 Claims, 5 Drawing Sheets

BATTERY HOLDER AND ISOLATION ASSEMBLY

RELATED APPLICATION

The present application is a non-provisional patent application and claims priority benefit, with regard to all common subject matter, of earlier-filed U.S. provisional patent application titled "BATTERY HOLDER AND ISOLATION ASSEMBLY", Ser. No. 61/829,785, filed May 31, 2013, incorporated by reference in its entirety into the present document.

BACKGROUND

Vehicles such as cars and boats typically include one or more batteries for storing and providing electrical power. These batteries often fail or have reduced performance due to excessive vibrations and shocks generated or transmitted by the vehicles. This is especially true for batteries used in boats, personal watercraft, all-terrain vehicles, and other vehicles that operate in rough water or uneven terrain. All types of batteries, and particularly high performance batteries used in marine applications, are expensive, difficult to replace, and difficult to safely dispose. Thus, prolonging their useful lives is highly desired.

Conventional battery holders such as battery cases secure their batteries to the vehicles but do not absorb vibrations and shocks transmitted or generated by the vehicles. Shock absorbing pads have been developed for placement under the batteries, but the batteries are no longer secured to the vehicles. Strapping the batteries to the vehicles or otherwise securing the batteries to the vehicles while they are on the shock absorbing pads results in the shock absorbing pads being ineffective because vibrations and shocks travel through the securing straps to the batteries.

SUMMARY

The present invention solves the above-described problems and provides a distinct advance in the art of battery holders. More particularly, the present invention provides a battery holder and isolation assembly that both secures a battery to a vehicle and mechanically isolates the battery from the vehicle.

A battery holder and isolation assembly constructed in accordance with an embodiment of the invention broadly includes a vehicle mounting plate, a lower battery containment plate, an upper battery containment plate, a number of spacer rods, and a number of shock absorbing elements.

The vehicle mounting plate is a corrosion resistant metal or plastic mounting plate including a number of fastener holes for securing the vehicle mounting plate to a surface of the vehicle and for securing the shock absorbing elements to the vehicle mounting plate.

The lower battery containment plate is a corrosion resistant metal or plastic mounting plate including an upper surface, a vertically extending lip, a number of fastener holes, and a number of spacer rod holes. The upper surface may include a recessed area for receiving a bottom portion of the battery therein. The vertically extending lip extends upward around the recessed area and retains the bottom portion of the battery in the recessed area. The fastener holes receive fasteners of the shock absorbing elements therethrough for securing the lower battery containment plate to the shock absorbing elements. The spacer rod holes of the lower battery containment plate are counterbore throughholes for receiving lower ends of the spacer rods therein.

The upper battery containment plate is a corrosion resistant metal or plastic mounting plate including a lower surface, a vertically extending lip, a number of spacer rod holes, and a number of terminal openings. The lower surface may include a recessed area for receiving a top portion of the battery. The vertically extending lip extends around the recessed area and retains the top portion of the battery in the recessed area. The spacer rod holes of the upper battery containment plate receive upper spacer rod fasteners therethrough for connecting top ends of the spacer rods to the upper battery containment plate.

The spacer rods are elongated metal rods, bolts, straps, or other fasteners. The spacer rods are fastened to the lower battery containment plate and the upper battery containment plate via the spacer rod holes. The spacer rods secure the battery between the lower battery containment plate and the upper battery containment plate.

The shock absorbing elements may be Sorbothane® Stud Mounts, rubber, or other suitable shock-absorbing components. The shock absorbing elements each include a shock absorption portion, a lower fastener, and an upper fastener. The shock absorption portion is formed of Sorbothane® material, rubber, or other suitable material. The lower and upper fasteners are embedded in the shock absorption portion with the shock absorption portion extending between the fasteners. The lower fastener secures the shock absorbing element to the vehicle or vehicle mounting plate and the upper fastener secures the shock absorbing element to the lower battery containment plate.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Turning now to the drawing figures, a battery holder 10 constructed in accordance with an embodiment of the present invention is illustrated. The battery holder 10 broadly comprises a vehicle mounting plate 12, a lower battery containment plate 14, an upper battery containment plate 16 or other securement component, a number of spacer rods 18, and a number of shock absorbing elements 20.

Figure 3:
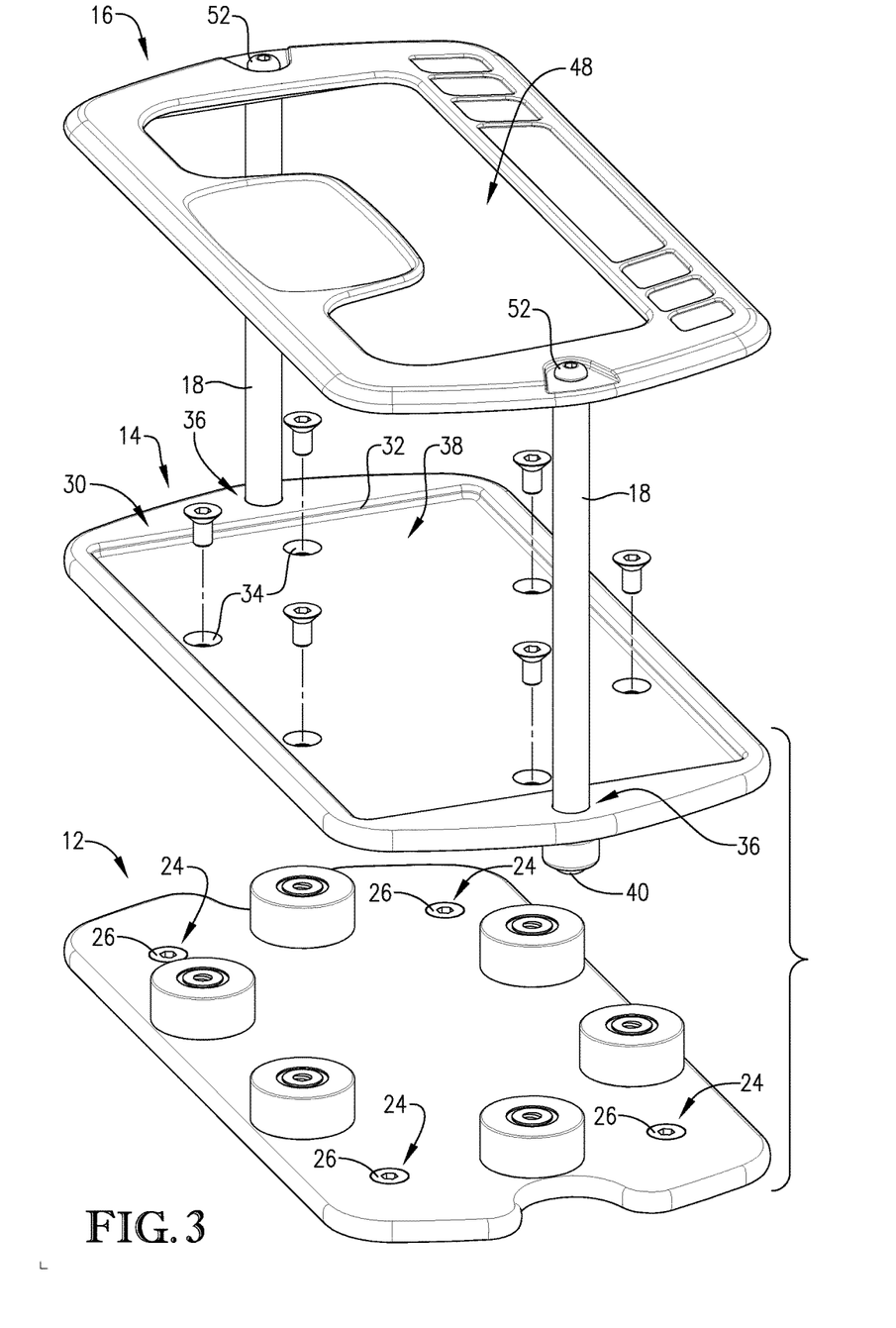
FIG. 3 is an exploded assembly view of the battery holder of FIG. 1.
Figure 4:
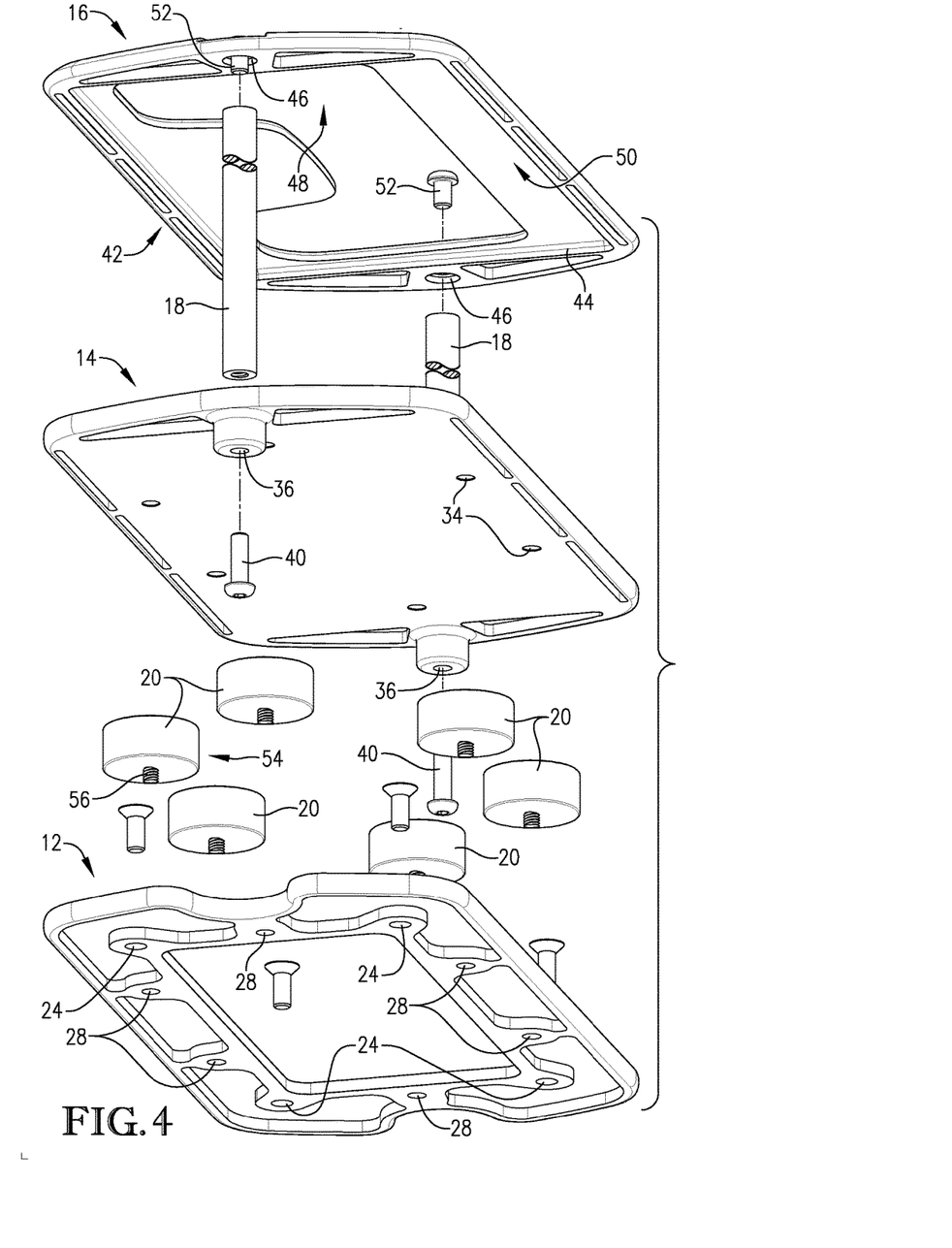
FIG. 4 is another exploded assembly view of the battery holder of FIG. 1.

The vehicle mounting plate 12 supports the weight of a battery 22 and the other components of the battery holder 10 on a surface or mounting component of the vehicle and may be formed of corrosion resistant billet aluminum, molded plastic, or any other suitable material. The vehicle mounting plate 12 includes a plurality of fastener holes 24 for receiving vehicle mounting fasteners 26 therethrough, as shown in FIGS. 3 and 4. Alternatively, the vehicle mounting plate 12 may be secured to the vehicle via straps, clamps, or other fasteners. The vehicle mounting plate 12 also includes additional fastener holes 28 for receiving shock absorber fasteners therethrough. It will be understood that an alternative configuration of the invention may not use a vehicle mounting plate with the shock absorbing fasteners being secured directly to the vehicle.

Figure 1:
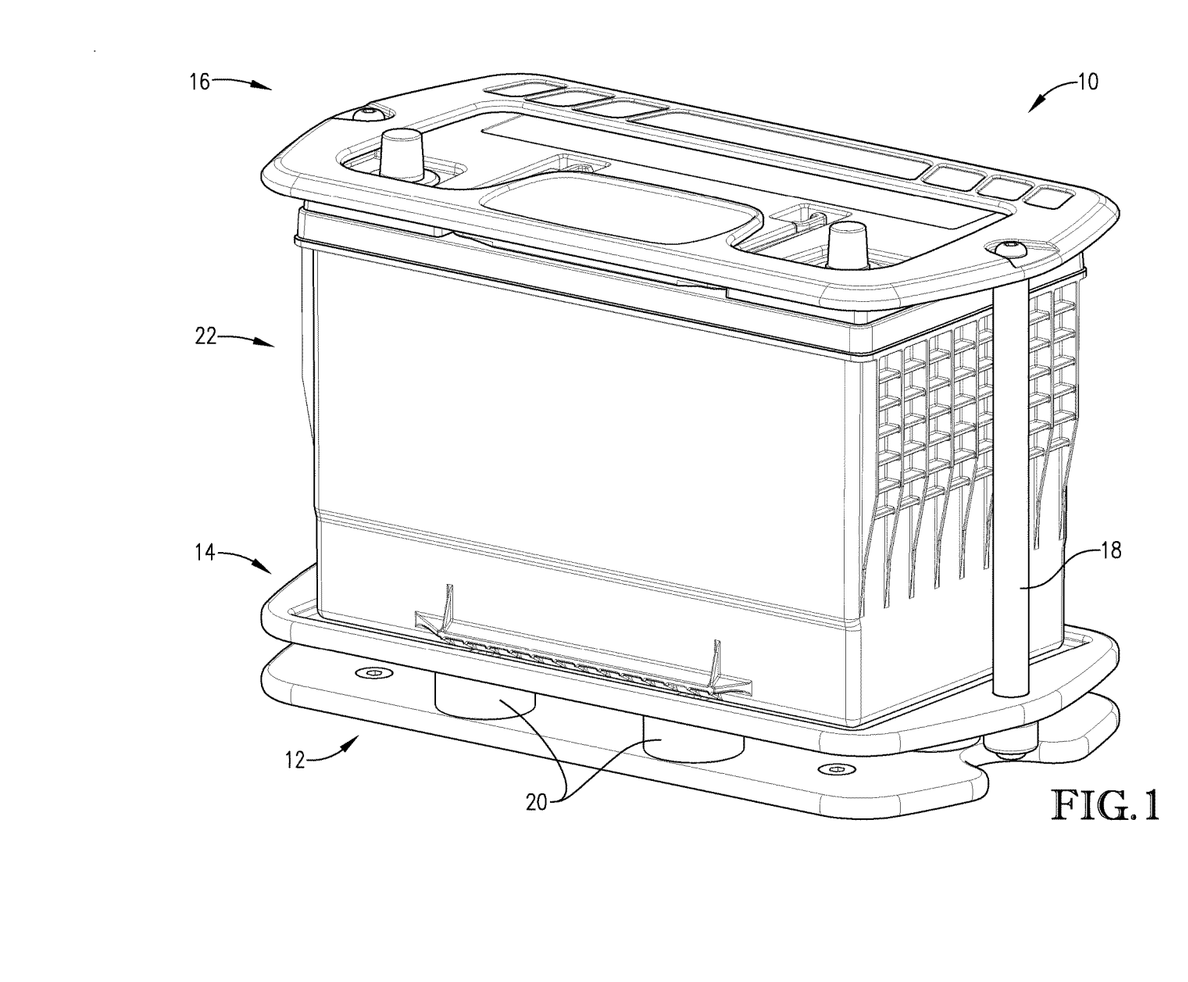
FIG. 1 is a perspective view of a battery holder constructed in accordance with an embodiment of the present invention and shown holding a battery.
Figure 2:
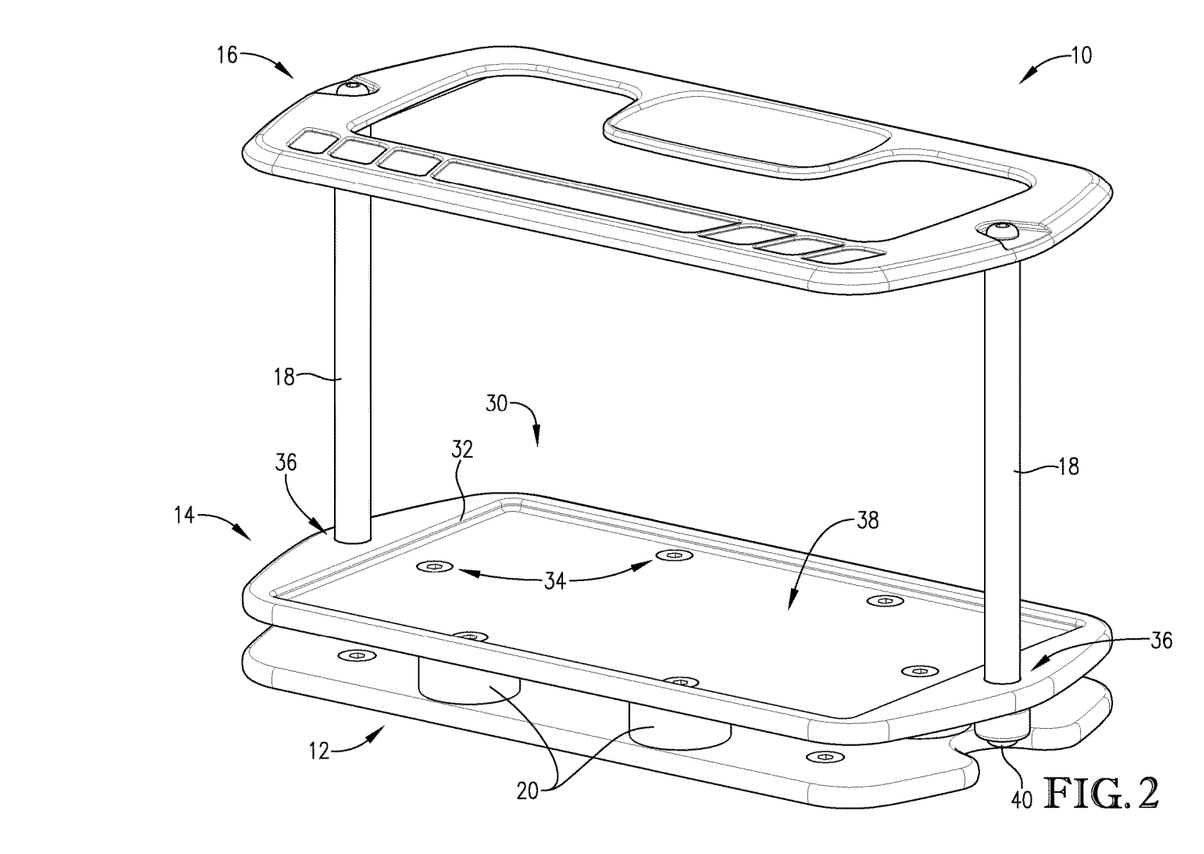
FIG. 2 is another perspective view of the battery holder of FIG. 1 without the battery.

The lower battery containment plate 14 supports the weight of the battery 22 on the shock absorbing elements 20 and may be formed of corrosion resistant billet aluminum, molded plastic, or any other suitable material. The lower battery containment plate 14 includes an upper surface 30, a vertically extending lip 32, a plurality of shock absorber fastener holes 34, and a plurality of spacer rod holes 36, as shown in FIGS. 2-4. The upper surface 30 includes a recessed area 38 for positioning a bottom portion of the battery 22 therein. The lip 32 retains the bottom portion of the battery 22 and any leaking battery liquid in the recessed area 38. The lip 32 extends around the recessed area 38 and extends upward from the recessed area approximately $\frac{1}{8}^{th}$ of an inch to 1 inch. The shock absorber fastener holes 34 receive shock absorber fasteners therethrough and are spaced from each other in line with the shock absorbing elements 20. The shock absorber fastener holes 34 may be countersunk or counterbore for preventing battery liquid from leaking therethrough when shock absorber fasteners are secured therein. The spacer rod holes 36 are counterbore through-holes for receiving lower ends of the spacer rods 18 in the wider counterbore portion and for receiving lower spacer rod fasteners 40 through the narrow through-hole portion. The lower spacer rod fasteners 40 are helical-threaded bolts having a male or female hex head, square head, or any other suitable head. The male hex head allows the lower spacer rod fasteners 40 to be tightened via a standard wrench, hex key, or other tool, which reduces the clearance necessary below the spacer rod holes 36. It will be understood that the counterbore feature of the spacer rod holes 36 may be employed in the spacer rod holes of the upper battery containment plate (described below) instead.

The upper battery containment plate 16 covers the top of the battery 22 and may be formed of corrosion resistant billet aluminum, molded plastic, or any other suitable material. The upper battery containment plate 16 includes a lower surface 42, a vertically extending lip 44, a plurality of spacer rod holes 46, and one or more terminal openings 48. The lower surface 42 includes a recessed area 50 for receiving a top portion of the battery 22. The lip 44 retains the battery 22 in the recessed area 50 under the upper battery containment plate 16. The lip 44 extends around the recessed area 50 and extends downward from the recessed area approximately $\frac{1}{8}^{th}$ of an inch to 1 inch. The spacer rod holes 46 receive upper spacer rod fasteners 52 therethrough and are aligned with the spacer rod holes 36 of the lower battery containment plate 14. The spacer rod holes 46 may each be positioned in a recessed area of the upper battery containment plate so that the upper spacer rod fasteners 52 do not extend above an upper surface of the upper battery containment plate 16. The upper spacer rod fasteners 52 are helical-threaded bolts having a male or female hex head, square head, or any other suitable head. The head may also be a round head, flat head, button head, or other smooth head for providing an attractive look to the battery holder 10 and for minimizing the chance of the upper spacer rod fasteners 52 inadvertently becoming loose. The terminal opening 48 provides access to the battery terminals and/or the filler caps of the battery 22 and extends through the recessed area 50 of the lower surface 42. The terminal opening 48 may be a regular shape such as a slot or may be an irregular shape for providing access to terminals and/or filler caps of different sized batteries. As an alternative to the upper battery containment plate 16, a securement component such as a covering, a lid, a case, or one or more straps, cords, ropes, chains, clamps, brackets, U-shaped bolts, side plates, or other elements may be used for securing the battery 22 to the lower battery containment plate 14.

The spacer rods 18 retain the upper battery containment plate 16 over the battery 22 and are elongated metal rods, bolts, or other fasteners. The spacer rods 18 extend from the spacer rod holes 36 of the lower containment plate 14 to the spacer rod holes 46 of the upper containment plate 16. In one embodiment, the battery holder 10 includes two spacer rods 18 with one rod extending near each end of the battery holder 10.

Figure 5:
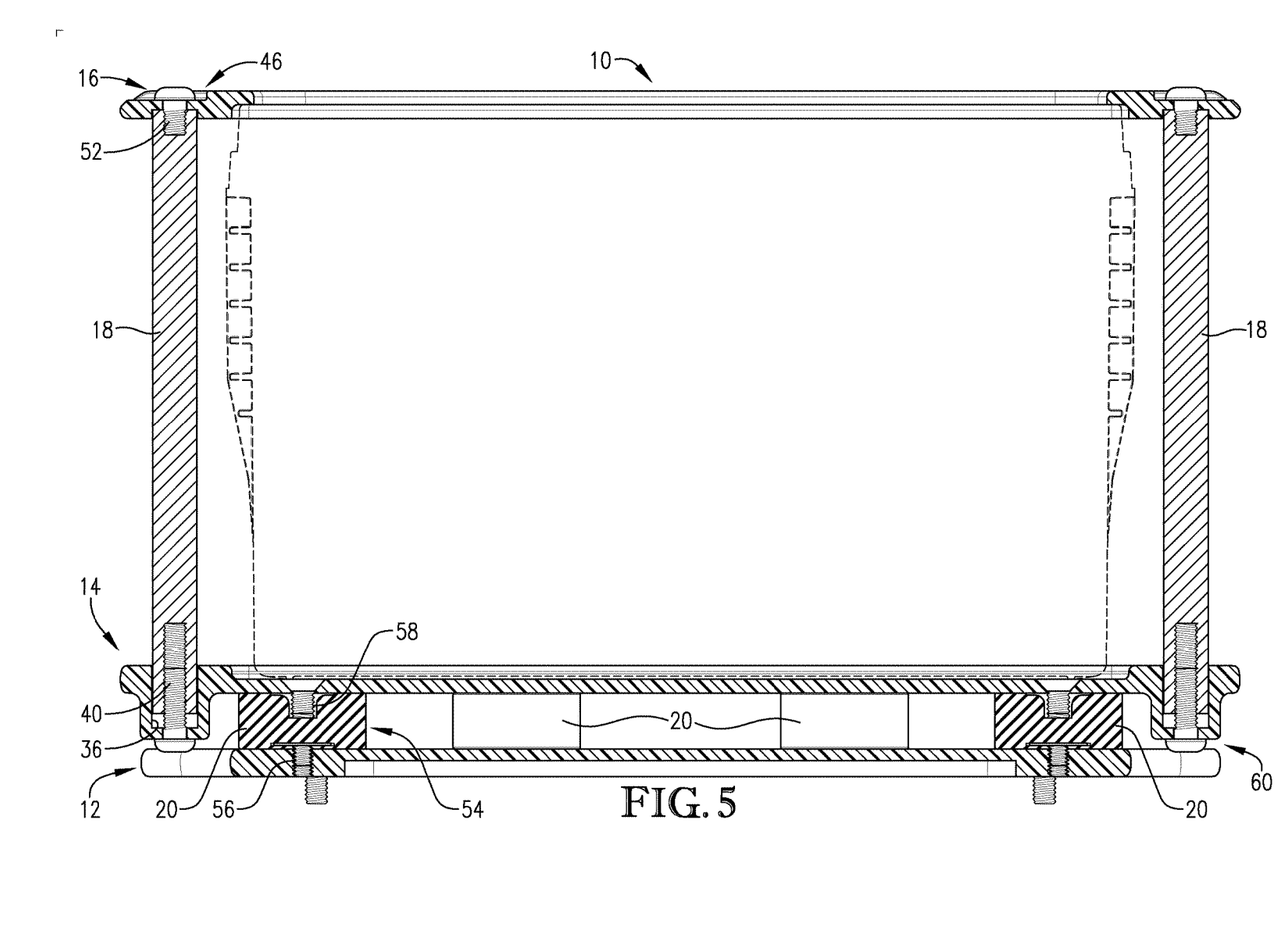
FIG. 5 is a vertical sectional view of the battery holder of FIG. 1.

The shock absorbing elements 20 isolate the battery 22 from vibrations and shocks generated or transmitted by the vehicle and may be disc-shaped or any other suitable shape. The shock absorbing elements 20 may be Sorbothane® Stud Mounts, rubber, or other suitable component. The shock absorbing elements 20 are positioned between the vehicle mounting plate 12 and the lower containment plate 14 in line with the fastener holes 24 of the vehicle mounting plate 12 and the fastener holes 34 of the lower battery containment plate 14, as shown in FIG. 5. In one embodiment, the battery holder 10 includes six shock absorbing elements 20 with four elements positioned in a rectangular array and two elements spaced on opposite sides of the rectangular array.

The shock absorbing elements 20 include a shock absorption portion 54, a lower shock absorber fastener 56, and an upper shock absorber fastener 58. The shock absorption portion 54 absorbs the vibrations and shocks generated or transmitted by the vehicle and may be formed of Sorbothane® material, rubber, or other suitable material. The lower fastener 56 may be a male or female-type threaded fastener or any other suitable fastener embedded into the bottom of the shock absorption portion 54. The upper fastener 58 may be a female or male-type threaded fastener embedded into the top of the shock absorption portion 54 and extending upwards. The lower fastener 56 and the upper fastener 58 are separated from each other by the shock absorption portion 54 so that vibrations and shocks are not transmitted through the fasteners 56, 58.

The above-described battery holder 10 may be assembled as follows: first, the vehicle mounting plate 12 is positioned on a battery mounting surface or bracket of the vehicle and fastened to the surface or bracket via the vehicle mounting fasteners 26. The shock absorbing elements are then fastened to the vehicle mounting plate 12 via the lower shock absorber fasteners 56. The lower battery containment plate 14 is then fastened to the shock absorbing elements 20 via the upper shock absorber fasteners 58 with the recessed area 38 facing upward and with the lower spacer rod fasteners 40 inserted upward into the narrow portion of the counterbore spacer rod holes 36. In some embodiments, the lower spacer rod fasteners 40 must be inserted into the spacer rod holes 36 before the lower battery containment plate 14 is fastened to the shock absorbing elements 20 because there is not enough clearance between the lower battery containment plate and the vehicle mounting plate 12 when assembled. The battery 22 is then placed in the recessed area 38 of the lower battery containment plate 14. The spacer rods 18 are then fastened to the upper battery containment plate 16 via the upper spacer rod fasteners 52. The upper battery containment plate 16 is then placed over the top of the battery 22 with the spacer rods 18 extending downward and with the recessed area 50 of the upper battery containment plate 16 facing downward so that the upper portion of the battery 22 is received in the recessed area 50. The terminals of the battery will also extend upward through the terminal opening 48. The lower ends of the spacer rods 18 are also inserted into the counterbore portion of the spacer rod holes 36 with the ends of the spacer rods 18 fitting over the ends of the lower spacer rod fasteners 40 that are extending upward through the spacer rod holes. The lower spacer rod fasteners 40 are then turned using a conventional wrench, hex key, or other tool so that the helical threads of the lower spacer rod fasteners 40 draw the lower ends of the spacer rods 18 further into the counterbore portion of the spacer rod holes 36. The lower spacer rod fasteners 40 are tightened until the upper battery containment plate 16 is snug against the top of the battery 22. Depending on the height of the battery 22, the lower ends of the spacer rods 18 may extend only partially into the counterbore portion of the spacer rod holes 36 when the lower spacer rod fasteners 40 are fully tightened.

In one embodiment of the invention, the vehicle mounting plate 12, the lower battery containment plate 14, and the shock absorbing elements 20 are pre-assembled into a shock base 60. The shock base 60 is mounted to the vehicle surface. The battery 22 is then placed on the lower battery containment plate 14 and the upper battery containment plate 16 is attached over the battery 22 via the spacer rods 18 as described above.

In another embodiment of the invention, a securement component is used instead of the upper battery containment plate 16 to secure the battery 22 to the lower battery containment plate 14. For example, a strap could be weaved through two slots in the lower battery containment plate 14 and cinched down over the battery 22. As another example, a case lid could be placed over the battery and screwed or snapped onto the lower battery containment plate 14.

In another embodiment of the invention, the shock absorbing elements 20 may be secured directly to the vehicle without the use of a vehicle mounting plate 12.

When the battery holder 10 is assembled, the lower battery containment plate 14 and the upper battery containment plate 16 (or securement component) secure the battery 22 between them, and the shock absorbing elements 20 mechanically isolate the battery 22 from the vehicle. Because the lower and upper shock absorber fasteners 56, 58 are not connected to each other, the only physical connection between the battery containment plates 14, 16 and the vehicle mounting plate 12 is the shock absorption portion 54. This prevents vibrations and shocks from passing through the fasteners 56, 58 to the battery 22. Specifically, when the shock absorbing elements 20 are subjected to a compressive force, they compress inwardly from the top to bottom and bulge outwardly along their radial sidewalls to absorb and dampen the force. Similarly, when the shock absorbing elements 20 are subjected to a tensional force, they stretch outwardly from top to bottom and compress inwardly along their radial sidewalls to absorb or dampen the force.

The above-described battery holder 10 provides several advantages over conventional battery holders. For example, the battery holder 10 both secures the battery 22 to the vehicle and protects the battery 22 from vibrations and shocks. The terminal opening of the upper battery containment plate 16 allows the terminals and fill caps of batteries of different sizes to be accessed. The counterbore spacer rod holes 36 allow for the spacer rods 18 to be drawn into the counterbore portion of the spacer rod holes 36 to a depth corresponding to the height of the battery 22. This allows for the battery holder 10 to secure batteries of different heights and obviates the need to use different battery holders for different sized batteries.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A battery holder for holding a battery and for mechanically isolating the battery from a vehicle, the battery holder comprising:
    a vehicle mounting plate for securing the battery holder to the vehicle, the vehicle mounting plate including a plurality of holes for receiving fasteners therethrough;
    a lower battery containment plate for supporting the battery thereon;
    an upper battery containment plate for retaining the battery in the battery holder; and
    at least one shock absorbing element positioned between the vehicle mounting plate and the lower battery containment plate for absorbing shocks and vibrations received from the vehicle, the at least one shock absorbing element forming the only physical connection between the battery and the vehicle mounting plate such that no unmitigated pathways exist for shocks and vibrations to reach the battery from the vehicle so that the battery is mechanically isolated from the vehicle.

2. The battery holder of claim 1, wherein the lower battery containment plate comprises an upper surface having a recessed region for receiving a bottom portion of the battery and for receiving any battery liquid leaking from the battery, a lip extending around the recessed region of the upper surface for retaining the bottom portion of the battery and any leaking battery liquid in the recessed region, and a plurality of fastener holes for receiving fasteners therethrough, the upper battery containment plate comprising at least one opening for accessing terminals and filler caps of the battery, a lower surface having a recessed region for receiving a top portion of the battery, and a lip extending around the recessed region of the lower surface for retaining the top portion of the battery in the recessed region of the lower surface of the upper battery containment plate.

3. The battery holder of claim 2, wherein the fastener holes extend through the recessed region and are configured to prevent battery liquid from draining therethrough when fasteners are inserted therein.

4. The battery holder of claim 2, wherein the at least one opening provides access to terminals of different sized batteries.

5. The battery holder of claim 1, wherein the vehicle mounting plate, the lower battery containment plate, and the shock absorbing elements are pre-assembled into a shock base.

6. The battery holder of claim 1, wherein the battery holder is configured to retain batteries of different heights between the lower battery containment plate and the upper battery containment plate.

7. The battery holder of claim 6, further comprising a plurality of spacer rods for fastening the upper battery containment plate to the lower battery containment plate.

8. The battery holder of claim 7, wherein the battery holder includes two spacer rods positioned near opposite ends of the battery holder.

9. The battery holder of claim 7, wherein the lower battery containment plate includes a number of counterbore through-holes for receiving a helical-threaded end of one of the spacer rods in the counterbore portion of the through-hole and for receiving a helical-threaded spacer rod fastener upward through the through-hole, the spacer rod fastener being configured to engage the helical-threaded end of the spacer rod and to draw the spacer rod downward into the counterbore portion of the through-hole so as to tighten the upper battery containment plate against the top of the battery.

10. The battery holder of claim 9, wherein the helical-threaded ends of the spacer rods are female-type receivers and the spacer rod fasteners are male-type fasteners.

11. The battery holder of claim 1, wherein the at least one shock absorber includes a shock absorption portion for absorbing vibrations and shocks received from the vehicle, a lower fastener for connecting the shock absorber to the vehicle mounting plate, and an upper fastener for connecting the shock absorber to the lower battery containment plate, the shock absorption portion extending between the lower fastener and the upper fastener.

12. The battery holder of claim 11, wherein the lower fastener is a female-type fastener embedded in the bottom of the shock absorber and the upper fastener is a male-type fastener embedded in the top of the shock absorber and extending from the top of the shock absorber.

13. The battery holder of claim 1, wherein the at least one shock absorber comprises six shock absorbers.

14. The battery holder of claim 13, wherein four of the six shock absorbers are arranged in a rectangular array and two of the six shock absorbers are spaced from the rectangular array on opposite sides of the rectangular array.

15. The battery holder of claim 1, wherein the vehicle mounting plate, the lower battery containment plate, and the upper battery containment plate include rounded exterior edges.

16. The battery holder of claim 1, wherein the lower battery containment plate and the upper battery containment plate are formed of molded plastic.

17. The battery holder of claim 1, wherein the lower battery containment plate and the upper battery containment plate are formed of corrosion-resistant billet aluminum.

18. The battery holder of claim 1, wherein the lower battery containment plate and the upper battery containment plate are powder coated to prevent corrosion.

19. A battery holder for holding a battery and for mechanically isolating the battery from a vehicle, the battery holder comprising:
  a vehicle mounting plate for securing the battery holder to the vehicle, the vehicle mounting plate including a plurality of holes for receiving fasteners therethrough;
  a lower battery containment plate for supporting the battery thereon, the lower battery containment plate being formed of corrosion resistant billet aluminum and comprising:
    an upper surface having a recessed region for receiving a bottom portion of the battery;
    a lip extending around the recessed region of the upper surface for retaining the bottom portion of the battery in the recessed region of the lower battery containment plate; and
    a plurality of fastener holes for receiving fasteners therethrough;
  an upper battery containment plate for retaining the battery on the lower battery containment plate, the upper battery containment plate being formed of corrosion resistant billet aluminum and comprising:
    at least one opening for accessing terminals and filler caps of the battery, the opening being configured to allow access to terminals and filler caps of different batteries;
    a lower surface having a recessed region for receiving a top portion of the battery; and
    a lip extending around the recessed region of the lower surface for retaining the battery in the recessed region of the upper battery containment plate;
  a plurality of spacer rods for fastening the upper battery containment plate to the lower battery containment plate, the spacer rods being configured to retain batteries of different heights between the lower battery containment plate and the upper battery containment plate; and
  a plurality of shock absorbing elements positioned between the vehicle mounting plate and the lower battery containment plate for absorbing vibrations and shocks received from the vehicle so as to mechanically isolate the battery from the vehicle.

20. A battery holder for holding a battery and for mechanically isolating the battery from a vehicle, the battery holder comprising:
  a lower battery containment plate for supporting the battery thereon;
  a securement component for retaining the battery in the battery holder; and at least one shock absorbing element positioned between the vehicle and the lower battery containment plate for absorbing shocks and vibrations received from the vehicle, the at least one shock absorbing element being configured to form the only physical connection between the battery and the vehicle such that no unmitigated pathways exist for shocks and vibrations to reach the battery from the vehicle so that the battery is mechanically isolated from the vehicle.

21. A battery holder for holding a battery and for mechanically isolating the battery from a vehicle, the battery holder consisting of:
- a securement element for securing the battery holder to the vehicle; and
- a shock and vibration isolating element configured to be coupled between the securement element and the vehicle, the shock and vibration isolating element being configured to form the only physical connection between the battery and the securement element such that no unmitigated pathways exist for shocks and vibrations to reach the battery from the vehicle so that the battery is mechanically isolated from the vehicle.

* * * * *